US012630954B2

(12) United States Patent
Han et al.

(10) Patent No.: US 12,630,954 B2
(45) Date of Patent: May 19, 2026

(54) COMPOUND EQUIPMENT OF LATEX-FREE TUFTED CARPET

(71) Applicants: Binzhou Oriental Carpet Co., Ltd., Binzhou City (CN); SHANDONG YUANFENG TEXTILE MACHINERY CO., LTD., Zaozhuang (CN); Xi'an Polytechnic University, Xi'an City (CN); Shanghai Saibo Textile Technology Co., Ltd., Fengxian District (CN)

(72) Inventors: Yi Han, Binzhou City (CN); Yanzhao Liu, Binzhou City (CN); Yijun Yao, Binzhou City (CN); Hailiang Wu, Binzhou City (CN); Miao Wang, Binzhou City (CN); Ying Xue, Binzhou City (CN); Yanqin Shen, Binzhou City (CN); Yihai Liu, Binzhou City (CN); Qingjie Xu, Binzhou City (CN); Jun Yan, Binzhou City (CN); Wenli Zhang, Binzhou City (CN)

(73) Assignees: Xi'an Polytechnic University, Binzhou City (CN); Binzhou Oriental Carpet Co., Ltd., Xi'an City (CN); Shanghai Saibo Textile Technology Co., Ltd., Zaozhuang (CN); SHANDONG YUANFENG TEXTILE MACHINERY CO., LTD., Fengxian District (CN)

( * ) Notice: Subject to any disclaimer, the term of this patent is extended or adjusted under 35 U.S.C. 154(b) by 103 days.

(21) Appl. No.: 18/651,714

(22) Filed: May 1, 2024

(65) Prior Publication Data

US 2025/0163624 A1 May 22, 2025

(30) Foreign Application Priority Data

Nov. 16, 2023 (CN) .......................... 202311531143.0

(51) Int. Cl.
 B32B 38/00 (2006.01)
 B65H 23/182 (2006.01)
 (Continued)

(52) U.S. Cl.
 CPC .......... D05C 15/14 (2013.01); B32B 38/1875 (2013.01); B65H 23/1825 (2013.01); (Continued)

(58) Field of Classification Search
 CPC ..... B32B 37/0015; B32B 37/06; B32B 37/08; B32B 37/10; B32B 37/1054; (Continued)

(56) References Cited

U.S. PATENT DOCUMENTS

| | | | | | |
|---|---|---|---|---|---|
| 3,589,578 A | * | 6/1971 | Kamphausen | ........... | D06H 3/04 26/70 |
| 4,339,022 A | * | 7/1982 | Hoover | ................ | F16D 25/046 242/571.1 |
| 5,004,638 A | * | 4/1991 | Goss | .................... | D06N 7/0081 428/44 |

FOREIGN PATENT DOCUMENTS

CN 106585055 A * 4/2017 ............. B32B 37/10

* cited by examiner

*Primary Examiner* — Michael A Tolin
(74) *Attorney, Agent, or Firm* — Gearhart Law LLC

(57) ABSTRACT

A compound equipment of a latex-free tufted carpet is provided. The compound equipment includes an unwinding device, a compound roller, and a shaping device. The unwinding device is configured to unwind a rolled blank blanket, a hot-melt fiber mesh, and secondary cloth. The compound roller is configured to stack and compound the unwound blank carpet, the unwound hot-melt fiber mesh and the unwound secondary cloth in sequence to obtain a pre-formed tufted carpet. The shaping device is configured for the setting of the preformed tufted carpet at a preset temperature to obtain a finished tufted carpet. Combined with (Continued)

the hot-melt fiber mesh, the secondary cloth and the blank carpet are consolidated by means of thermally induced bonding, and latex is not needed for consolidation.

7 Claims, 2 Drawing Sheets

(51) Int. Cl.
    *D05C 5/02*         (2006.01)
    *D05C 15/14*       (2006.01)
    *D05C 15/20*       (2006.01)
    *D05C 17/02*       (2006.01)

(52) U.S. Cl.
    CPC .............. *D05C 5/02* (2013.01); *D05C 15/20* (2013.01); *D05C 17/02* (2013.01); *B65H 2553/41* (2013.01); *B65H 2701/1922* (2013.01)

(58) Field of Classification Search
    CPC ........ B32B 37/1207; B32B 2037/1215; B32B 2037/1223; B32B 2037/123; B32B 38/1875; B32B 41/00; B65H 16/00; B65H 16/10; B65H 16/103; B65H 16/106; B65H 20/005; B65H 20/16; B65H 20/20; B65H 20/24; B65H 20/30; B65H 20/32; B65H 20/34; B65H 23/02; B65H 23/022; B65H 23/025; B65H 23/0251; B65H 23/18; B65H 23/182; B65H 23/1825; B65H 23/188; B65H 23/1888; B65H 23/192; B65H 75/24; B65H 75/242; B65H 75/243; B65H 75/2437; B65H 2553/40; B65H 2553/41; B65H 2553/80; B65H 2701/1922; D06N 7/0071; D06N 7/0076; D06N 7/0078; D06N 7/0081
    See application file for complete search history.

COMPOUND EQUIPMENT OF LATEX-FREE TUFTED CARPET

CROSS-REFERENCE TO RELATED APPLICATION

This patent application claims the benefit and priority of Chinese Patent Application No. 202311531143.0 filed with the China National Intellectual Property Administration on Nov. 16, 2023, the disclosure of which is incorporated by reference herein in its entirety as part of the present application.

TECHNICAL FIELD

The present disclosure provides compound equipment of a latex-free tufted carpet, and belongs to the technical field of tufted carpet processing equipment.

BACKGROUND

Tufted carpet is a machine-made carpet with loop pile or cut pile carpet surface, which is formed by mechanical pile planting on chemical fiber fabric base cloth with row needles.

The pile of the traditional tufted carpet is consolidated by the latex backing technology, that is, the latex adhesive is used to consolidate the pile and base cloth of the carpet to prevent the carpet from lint shedding.

Latexes for carpets include styrene-butadiene latex and vinyl acetate-acrylate latex, which are polymerized from styrene, butyl acrylate, vinyl acetate and other monomers. In the process of production and use, a large number of volatile organic compounds (VOC) will be released, resulting in poor production and use environment and serious pollution.

SUMMARY

An objective of the present disclosure is to provide compound equipment of a latex-free tufted carpet, so as to solve the technical problems of poor production and use environment and serious pollution for the tufted carpet in the prior art.

Compound equipment of a latex-free tufted carpet includes an unwinding device, a compound roller, and a shaping device.

The unwinding device is configured to unwind a coiled blank blanket, a hot-melt fiber mesh and secondary cloth.

The compound roller is configured to stack and compound the unwound blank carpet, the unwound hot-melt fiber mesh and the unwound secondary cloth so as to obtain a preformed tufted carpet.

The shaping device is configured for shaping the preformed tufted carpet at a preset temperature to obtain a finished tufted carpet.

Preferably, the shaping device includes a drying cylinder roller, and two stentering needle plates in fit with a cross-sectional shape of the drying cylinder roller.

The two stentering needle plates are respectively arranged on both sides of the drying cylinder roller, and coaxial with the drying cylinder roller.

Preferably, the shaping device further includes a pressing unit.

The pressing unit abuts against the drying cylinder roller, and is configured to press the preformed tufted carpet having been heated by the drying cylinder roller.

Preferably, the shaping device further includes a cooling unit.

The cooling unit is configured to cool and shape the pressed preformed tufted carpet to obtain the finished tufted carpet.

Preferably, unwinding device includes a blank carpet unwinding unit, a hot-melt fiber mesh unwinding unit, and a secondary cloth unwinding unit.

Preferably, the hot-melt fiber mesh unwinding unit includes an air expanding shaft.

The air expanding shaft is arranged at a center of a coil of the hot-melt fiber mesh and configured to drive the coiled hot-melt fiber mesh to unwind.

Preferably, the hot-melt fiber mesh unwinding unit further includes a tension monitoring module.

The tension monitoring module is perpendicular to a mesh surface of the unwound hot-melt fiber mesh, and is configured to monitor tension of the unwound hot-melt fiber mesh.

Preferably, the tension monitoring module includes a ranging photoelectric sensor and a controller.

The ranging photoelectric sensor is perpendicular to the mesh surface of the unwound hot-melt fiber mesh, and is configured to acquire the tension of the unwound hot-melt fiber mesh.

The controller is connected to the ranging photoelectric sensor and the air expanding shaft, and is configured to adjust an unwinding speed of the air expanding shaft according to the tension of the hot-melt fiber mesh.

Compared with the prior art, the compound equipment of the latex-free tufted carpet provided by some embodiments has the following beneficial effects:

Combined with the hot-melt fiber mesh, the secondary cloth and the blank carpet are consolidated by means of thermally induced bonding, so that latex is not needed for consolidation. Therefore, no volatile organic compounds are released in the process of production and use. Meanwhile, as the hot-melt fiber mesh is in the shape of a thin layer after hot melting, the prepared finished tufted carpet has the advantages of excellent elasticity, soft hand feeling, flexibility and the like. The problems of poor elasticity, hard hand feeling and fear of bending of the finished tufted carpet caused by the calcium powder-containing latex adhesive in the prior art are solved.

Numeral references of components and the accompanying drawings are listed as follows:

101 blank carpet unwinding unit; 102 hot-melt fiber mesh unwinding unit; 1021 air expanding shaft; 1022 ranging photoelectric sensor; 103 secondary cloth unwinding unit; 2 compound roller; 301 drying cylinder roller; 3011 transmission motor reducer; 302 pressing unit; 303 cooling unit; 3041 needle plate; 3042 sprocket; 3043 chain; 401 trimming device; 402 selvage collecting device; 5 synchronous tension bracket; 6 carpet storage rack; 7 rolling mill; 8 winding machine; 9 carpet storage box; 10 spreading roller; 11 flapping dust removal device; 12 vertical track; and 13 preformed tufted carpet.

DETAILED DESCRIPTION OF THE EMBODIMENTS

In the following description, specific details, such as specific system structure and technology, are set forth for the purpose of explanation rather than limitation, so as to thoroughly understand the embodiments of the present disclosure. However, those skilled in the art should know that the present disclosure may be practiced in other embodiments without these specific details. In other cases, detailed descriptions of well-known systems, devices, circuits, and methods are omitted, so as to describe the present disclosure without being obscured by unnecessary details.

Figure 1:
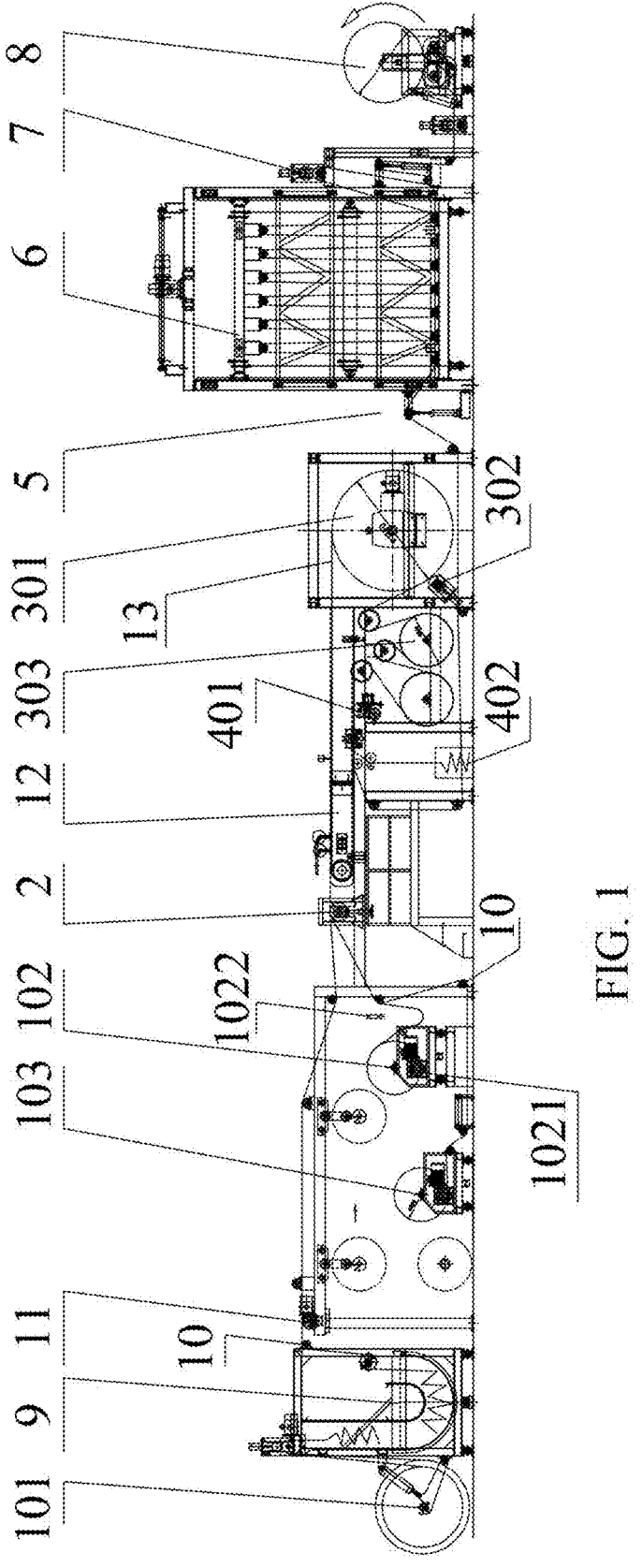
FIG. 1 is a schematic diagram of an overall structure of compound equipment of a latex-free tufted carpet according to an embodiment of the present disclosure.

As shown in FIG. 1, compound equipment of a latex-free tufted carpet includes an unwinding device, a compound roller 2, and a shaping device.

The unwinding device is configured to unwind a coiled blank blanket, a hot-melt fiber mesh, and secondary cloth.

The compound roller 2 is configured to stack and compound the unwound blank carpet, the unwound hot-melt fiber mesh and the unwound secondary cloth so as to obtain a preformed tufted carpet 13.

The shaping device is configured for the shaping of the preformed tufted carpet 13 at a preset temperature to obtain a finished tufted carpet.

The blank carpet in the embodiment of the present disclosure is a base carpet after pile planting.

In the embodiment of the present disclosure, combined with the hot-melt fiber mesh, the secondary cloth and the blank carpet are consolidated by means of thermally induced bonding, and latex is not needed for consolidation, so that no volatile organic compounds are released in the process of production and use.

Further, because the hot-melt fiber mesh is in the shape of a thin layer after hot melting, the prepared finished tufted carpet has the advantages of excellent elasticity, soft hand feeling, flexibility and the like. The problems of poor elasticity, hard hand feeling and fear of bending of the finished tufted carpet caused by the calcium powder-containing latex adhesive in the prior art are solved.

In the embodiment of the present disclosure, a preset temperature is 120° C. to 200° C. Only in the above temperature range, the hot-melt fiber mesh can be ensured to melt without damaging the blank blanket and the secondary cloth.

Figure 2:
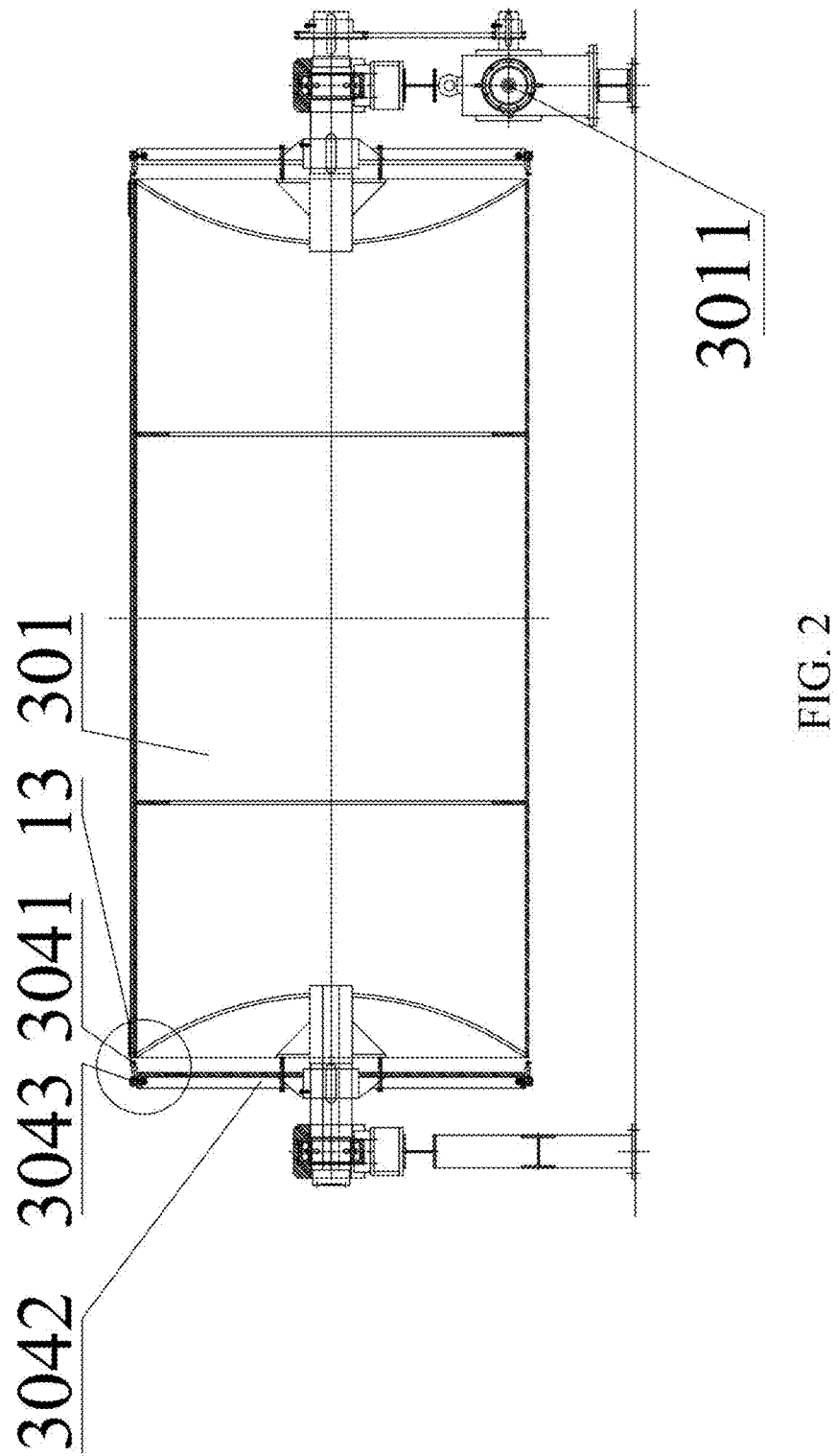
FIG. 2 is a structural schematic diagram of a shaping device in compound equipment of a latex-free tufted carpet according to an embodiment of the present disclosure.

In the embodiment of the present disclosure, when the prefabricated tufted carpet 13 is shaped at the preset temperature, high temperature causes the shrinkage and deformation of the blank carpet, the hot-melt fiber mesh and the secondary clot in different degrees, leading to wrinkles in the finished tufted carpet. In order to solve the problems above, the shaping device in the embodiment of the present disclosure includes a drying cylinder roller 301, and two stentering needle plates in fit with the cross-sectional shape of the drying cylinder roller 301, as shown in FIG. 2.

The two stentering needle plates are respectively arranged on both sides of the drying cylinder roller 301, and coaxial with the drying cylinder roller 301.

In this embodiment of the present disclosure, the two stentering needle plates are respectively arranged on both sides of the drying cylinder roller 301 and rotate synchronously with the drying cylinder roller 301 thus stentering the preformed tufted carpet 13 conveyed to the drying cylinder roller 301 and ensuring that the blank carpet, the hot-melt fiber mesh and the secondary cloth are free of shrinking during the shaping. So that the obtained finished tufted carpet has uniform width and flat surface. Meanwhile, in the embodiment of the present disclosure, the needle plate is configured for stentering, without damaging the blank blanket, the hot-melt fiber mesh and the secondary cloth.

In the embodiment of the present disclosure, the stentering needle plate includes a sprocket 342, a chain 3043 sleeved outside the sprocket 3042, and a needle plate 3041 fixedly connected to the chain 3043. In the embodiment of the present disclosure, a power device of the sprocket 3042 and a power device of the drying cylinder roller 301 are the same power device, thus achieving synchronous rotation of the sprocket 3042 and the drying cylinder roller 301. The power device specifically includes a transmission motor, and a transmission motor reducer 3011. The sprocket 3042 and the drying cylinder roller 301 are both directly connected to the transmission motor reducer 3011.

In order to improve the bonding firmness between the blank carpet and the secondary cloth, the shaping device of the embodiment of the present disclosure further includes a pressing unit 302.

The pressing unit 302 abuts against the drying cylinder roller 301, and is configured to press the preformed tufted carpet heated by the drying cylinder roller 301.

In the embodiment of the present disclosure, an abutting surface of the pressing unit 302 and the drying cylinder roller 301 is an arc surface, which can achieve pressing effect without damaging the blank carpet.

Further, in the embodiment of the present disclosure, the shaping device further includes a cooling unit 303. The cooling unit 303 is arranged on an extension line of a tangent plane of the drying cylinder roller 301 or on the extension line of the tangent plane of the drying cylinder roller 301 after the pressing unit 302. That is, the cooling unit 303 is arranged at the next working position of the drying cylinder roller 301, and is configured to cool and shape the pressed preformed tufted carpet 13 so as to obtain the finished tufted carpet. The finished tufted carpet after cooling and shaping is stable in shape and free of shrinkage during the use.

In the embodiment of the present disclosure, the unwinding device includes a blank carpet unwinding unit 101, a hot-melt fiber mesh unwinding unit 102, and a secondary cloth unwinding unit 103.

In order to prevent the hot-melt fiber mesh from being broken in the unwinding process, the hot-melt fiber mesh unwinding unit 102 includes an air expanding shaft 1021.

The air expanding shaft 1021 is arranged at the center of the coil of the hot-melt fiber mesh and configured to drive the coiled hot-melt fiber mesh to unwind. According to the present disclosure, the air expanding shaft 1021 is configured to drive the coiled hot-melt fiber mesh to unwind, thus avoiding a situation that the hot-melt fiber mesh is excessively stretched and broken caused by the slippage of a contact surface between the air expanding shaft 1021 and the center of the coiled hot-melt fiber mesh during unwinding.

In order to further prevent the hot-melt fiber mesh from being excessively stretched and broken, the hot-melt fiber mesh unwinding unit 102 in the embodiment of the present disclosure further includes a tension monitoring module.

The tension monitoring module is perpendicular to a mesh surface of the unwound hot-melt fiber mesh, and is configured to monitor the tension of the hot-melt fiber mesh.

In the embodiment of the present disclosure, the tension monitoring module may be a stress-based monitoring module, or a photoelectric ranging-based monitoring module. In a specific embodiment, the tension monitoring module includes a ranging photoelectric sensor 1022 and a controller.

The ranging photoelectric sensor 1022 is perpendicular to the mesh surface of the unwound hot-melt fiber mesh, and is configured to acquire the tension of the hot-melt fiber mesh.

The controller is connected to the ranging photoelectric sensor 1022 and the air expanding shaft 1021, and is configured to adjust the unwinding speed of the air expanding shaft 1021 according to the tension of the hot-melt fiber mesh.

Exemplary, the ranging photoelectric sensor 1022 is configured to transmit monitored information about a distance between the ranging photoelectric sensor and the hot-melt fiber mesh to the controller. When the controller determines that the distance from the ranging photoelectric sensor to the hot-melt fiber mesh is closer than that of the previous period, the rotation speed of the air expanding shaft 1021 is controlled to accelerate the rotation, thus achieving tension-free unwinding of the hot-melt fiber mesh.

In the embodiment of the present disclosure, the blank blanket unwinding unit 101 and the secondary cloth unwinding unit 103 may employ an air expanding shaft, or a conventional steel rotating shaft. The air expanding shaft is preferred.

The compound equipment of the latex-free tufted carpet is simple in structure and easy to operate, thus ensuring the tension-free unwinding of the hot-melt fiber mesh and that the prepared latex-free tufted carpet is flat, uniform in width, flexible, and elastic.

The latex-free tufted carpet prepared by the compound equipment of the latex-free tufted carpet does not release a large number of volatile organic compounds, and is uniform is width, soft and elastic, and smooth in surface.

In the following, a working process will be explained by taking specific compound equipment of a latex-free tufted carpet as an example.

In step 1, a coiled blank carpet, a coiled hot-melt fiber mesh and coiled secondary cloth are unwound.

In this embodiment of the present disclosure, the coiled blank carpet is unwound by a blank carpet unwinding unit 101 and then is stored in a carpet storage box 9. And then the unwound coiled blank carpet is subjected to width spreading by a spreading roller 10 and dust removal by a flapping dust removal device 11, conveyed to a compound roller 2 in the next process in turn.

The coiled hot-melt fiber mesh is unwound without tension by the hot-melt fiber mesh unwinding unit 102, spread by the spreading roller, and conveyed to the compound roller 2 in the next process in turn.

The coiled secondary cloth is unwound by the secondary cloth unwinding unit 103, spread by the spreading roller, and conveyed to the compound roller 2 in the next process in turn.

In step 2, the blank carpet, the hot-melt fiber mesh and the secondary cloth after unwinding are stacked and compounded in sequence to obtain a preformed tufted carpet 13.

In the embodiment of the present disclosure, the blank carpet, the hot-melt fiber mesh and the secondary cloth are stacked and compounded on the compound roller from top to bottom to obtain the performed tufted carpet 13.

In step 3, the preformed tufted carpet 13 is subjected to shaping at a preset temperature to obtain a finished tufted carpet.

In this step, the preformed tufted carpet 13 enters the drying cylinder roller 301, and is stented by the stentering needle plates at both sides of the drying cylinder roller. The heated preformed tufted carpet 13 is pressed by the pressing unit 302, thus making the blank carpet, the hot-melt fiber mesh and the secondary cloth closely connected.

Further, the preformed tufted carpet passing through the pressing unit 302 is cooled by the cooling unit 303, thus making the hot-melt fiber mesh after hot melting cooled and consolidated. So that the blank carpet, the hot-melt fiber mesh and the secondary cloth closely bonded so as to obtain the finished tufted carpet.

The obtained finished tufted carpet is subjected to post-treatment. Specifically, the finished tufted carpet is trimmed by a trimming device 401, and trimmed selvages are collected in a selvage collecting device 402. The trimmed finished tufted carpet enters a carpet storage rack 6 through a synchronous tension bracket 5, then passes through a rolling mill 7 and is wound up by a winding machine 8, so as to obtain the coiled finished tufted carpet.

The compound equipment of the latex-free tufted carpet provided by the present disclosure is simple in structure and easy to operate. The prepared latex-free tufted carpet does not release a large number of volatile organic compounds, and is uniform in width, soft and elastic, and smooth in surface.

The above is only a few embodiments of the present disclosure, and is not intended to limit the present disclosure in any form. Although the present disclosure is disclosed in the preferred embodiment, it is not intended to limit the present disclosure. Some changes or modifications made by any person skilled in the art using the technical contents disclosed above without departing the scope of the technical solution of the present disclosure are equivalent to equivalent embodiments, which are all within the scope of the technical solution of the present disclosure.

What is claimed is:

1. An apparatus for making a latex-free tufted carpet, the apparatus comprising an unwinding device, a compound roller, and a shaping device, wherein the unwinding device is configured to unwind a coiled blank blanket, a hot-melt fiber mesh and secondary cloth;

the compound roller is configured to stack and combine the unwound blank carpet, the unwound hot-melt fiber mesh and the unwound secondary cloth so as to obtain a preformed tufted carpet; and the shaping device is configured for shaping the preformed tufted carpet at a preset temperature to obtain a finished tufted carpet, wherein the shaping device comprises a heated roller, and two stentering needle plates which are shaped to fit with a cross-sectional shape of the heated roller;

the two stentering needle plates are respectively arranged on both sides of the heated roller, and coaxial with the heated roller.

2. The apparatus according to claim 1, wherein the shaping device further comprises a pressing unit;

the pressing unit abuts against the heated roller, and is configured to press the preformed tufted carpet by the heated roller.

3. The apparatus according to claim 1, wherein the shaping device further comprises a cooling unit;

the cooling unit is configured to cool and shape the preformed tufted carpet to obtain the finished tufted carpet.

4. The apparatus according to claim 1, wherein the unwinding device comprises a blank carpet unwinding unit, a hot-melt fiber mesh unwinding unit, and a secondary cloth unwinding unit.

5. The apparatus according to claim 4, wherein the hot-melt fiber mesh unwinding unit comprises an air expanding shaft;

the air expanding shaft is arranged at a center of a coil of the hot-melt fiber mesh and is configured to drive the coiled hot-melt fiber mesh to unwind.

6. The apparatus according to claim 5, wherein the hot-melt fiber mesh unwinding unit further comprises a tension monitoring module;

the tension monitoring module is perpendicular to a mesh surface of the unwound hot-melt fiber mesh, and is configured to monitor tension of the unwound hot-melt fiber mesh.

7. The apparatus according to claim 6, wherein the tension monitoring module comprises a ranging photoelectric sensor and a controller;

the ranging photoelectric sensor is perpendicular to the mesh surface of the unwound hot-melt fiber mesh, and is configured to acquire the tension of the unwound hot-melt fiber mesh; and the controller is connected to the ranging photoelectric sensor and the air expanding shaft, and is configured to adjust an unwinding speed of the air expanding shaft according to the tension of the hot-melt fiber mesh.

\* \* \* \* \*